United States Patent
Mohr et al.

(10) Patent No.: US 6,264,839 B1
(45) Date of Patent: Jul. 24, 2001

(54) PHOSPHONOMETHYLATED POLYVINYLAMINES AND PREPARATION AND USE THEREOF

(75) Inventors: Juergen Mohr, Gruenstadt; Knut Oppenlaender, Ludwigshafen; Walter Denzinger, Speyer; Heinrich Hartmann, Limburgerhof; Richard Baur, Mutterstadt; Charalampos Gousetis, Ludwigshafen; Alexander Kud, Eppelsheim, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 08/089,436

(22) Filed: Jul. 12, 1993

Related U.S. Application Data

(62) Division of application No. 07/775,929, filed on Nov. 6, 1991, now abandoned.

(30) Foreign Application Priority Data

Aug. 7, 1989 (DE) .............................. P 39 26 059
Aug. 6, 1990 (WO) .................. PCT/EP90/01284

(51) Int. Cl.$^7$ ................ C02F 1/42; C02F 1/28
(52) U.S. Cl. .......... 210/687; 210/699; 210/700; 525/340; 525/383; 526/277; 526/278; 526/310; 526/312
(58) Field of Search ................. 525/383, 340; 252/80, 82; 210/700, 699, 687; 526/278, 277, 310, 312

(56) References Cited

U.S. PATENT DOCUMENTS

| | | | |
|---|---|---|---|
| 3,298,956 | * 1/1967 | Irani ................. | 252/117 |
| 3,336,221 | * 8/1967 | Ralston .............. | 210/58 |
| 4,002,564 | * 1/1977 | Carbowel ............ | 210/38 R |
| 4,289,673 | * 9/1981 | Rowland ............. | 8/182 |
| 4,442,231 | * 4/1984 | Kataoka .............. | 521/32 |
| 4,648,883 | * 3/1987 | Podder ............... | 8/527 |
| 4,798,871 | * 1/1989 | Lai .................. | 525/328.2 |
| 4,830,837 | * 5/1989 | Justice .............. | 423/181 |
| 4,839,056 | * 6/1989 | Cahn ................. | 210/643 |
| 4,861,502 | * 8/1989 | Caswell .............. | 252/8.75 |

FOREIGN PATENT DOCUMENTS

856193 * 11/1970 (CA) .

OTHER PUBLICATIONS

F. Helfferich, "Ion Exchange", (1962), 19–20, McGraw–Hill (New York).*

* cited by examiner

*Primary Examiner*—Fred Zitomer
(74) *Attorney, Agent, or Firm*—Oblon, Spivak, McClelland, Maier & Neustadt, P.C.

(57) ABSTRACT

Phosphonomethylated poly-vinylamines which contain as characteristic structural elements units of the formula

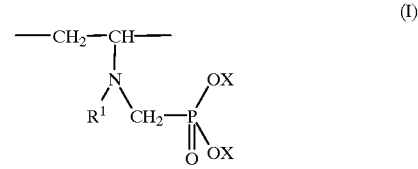

where $R^1$ is hydrogen, $C_1$–$C_6$-alkyl or

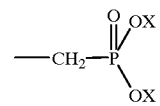

and X is hydrogen, an alkali metal, ammonium or one equivalent of an alkaline earth metal, are obtainable by phosphonomethylation of polymers which contain N-vinylamide or vinylamine groups and are useful as detergent additives and water treatment agents.

14 Claims, No Drawings

PHOSPHONOMETHYLATED POLYVINYLAMINES AND PREPARATION AND USE THEREOF

This application is a Divisional application of U.S. Ser. No. 07/775,929, filed on Nov. 6, 1991, now abandoned.

DESCRIPTION

The present invention relates to phosphonomethylated polyvinylamines, the preparation thereof and the use thereof as water treatment agents and as detergent additives.

U.S. Pat. No. 4,217,214 disclosed a polyvinylamine hydrochloride having a molecular weight of more than $3 \times 10^5$. It is prepared by reaction of acetaldehyde and acetamide to give ethylenebisacetamide, which is thermally cleaved into N-vinylacetamide and acetamide, polymerization of the N-vinylacetamide and hydrolysis of the poly-N-vinylacetamide. Polyvinylamine hydrochloride is used as a flocculant for particles suspended in water and for treating effluents and sludges.

U.S. Pat. No. 4,421,602 discloses partially hydrolyzed polymers of N-vinylformamide. The linear basic polymers described therein contain as characteristic components from 90 to 10 mol % of vinylamine units and from 10 to 90 mol % of N-vinylformamide units. They are prepared by polymerizing N-vinylformamide and hydrolyzing the polymers in the presence of acids or bases.

EP-A-0 216 387 disclosed a process for preparing water-soluble copolymers which contain copolymerized vinylamine units by copolymerizing (a) from 95 to 10 mol % of N-vinylformamide with
(b) from 5 to 90 mol % of an ethylenically unsaturated monomer selected from the group consisting of vinyl acetate, vinyl propionate, $C_1$–$C_4$-alkyl vinyl ethers, N-vinylpyrrolidone and esters, nitriles and amides of acrylic acid and methacrylic acid and then hydrolyzing the copolymer, wherein from 30 to 100 mol % of the formyl groups are eliminated from the copolymer.

EP-A-0 262 577 and EP-A-0 264 649 likewise disclose polymers which contain vinylamine units. They are prepared by polymerizing N-vinylformamide and substituted N-vinylamides and hydrolyzing the polymers to form vinylamine units.

J. Org. Chem. 31 (1966), 1603–1607, discloses the phosphonomethylation of amines. It is carried out in similar fashion to a Mannich reaction by reacting amines which contain at least one N—H group with phosphorous acid and formaldehyde at an acid pH.

This converts the >N—H group of the amine into the group

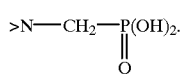

Such products are used for example as complexing agents for polyvalent metal ions.

It is an object of the present invention to provide new phosphonomethylated compounds.

We have found that this object is achieved by the present invention by providing phosphonomethylated polyvinylamines which contain as characteristic structural elements units of the formula

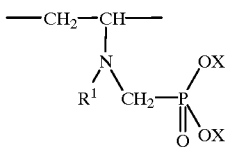

(I)

where
$R^1$ is hydrogen, $C_1$–$C_8$-alkyl or

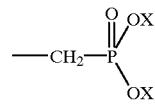

and
X is hydrogen, an alkali metal, ammonium or one equivalent of an alkaline earth metal.

Such phosphonomethylated polyvinylamines are obtainable by subjecting polymers which contain units of the formula

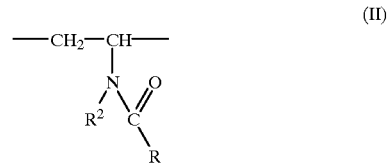

(II)

where R and $R^2$ are each hydrogen or $C_1$–$C_6$-alkyl, to a phosphonomethylation, ie. a reaction with formaldehyde and phosphorous acid, and simultaneous hydrolysis (mineral acid) in one step, or first to a hydrolytic elimination therefrom of the group —CO—R and then the polymeric remainder, composed of units of the formula

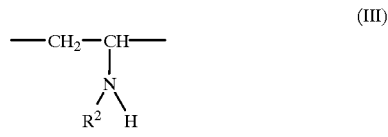

(III)

where $R^2$ is hydrogen or $C_1$–$C_6$-alkyl, to a phosphonomethylation.

The polymers which are subjected to the phosphonomethylation contain as essential monomers of group (a) compounds of the general formula

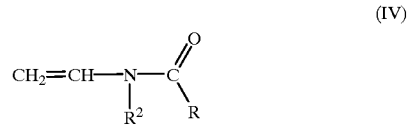

(IV)

where $R^2$ and R are each hydrogen or $C_1$–$C_6$-alkyl. The preferred monomer of the formula IV is N-vinylformamide, ie. R=$R^2$=H. Other suitable N-vinylamides of the formula IV are for example N-vinyl-N-methylformamide, N-vinylacetamide and N-vinyl-N-methylacetamide. In addition to the homopolymers of the vinylamides of the formula IV it is also possible to use copolymers of the monomers of group (a), for example copolymers of N-vinylformamide and N-vinylacetamide.

In addition to the homopolymers and copolymers of monomers (a) it is possible to use copolymers which contain as copolymerized units at least one monomer of group (b) which is copolymerizable with the monomers of group (a). Suitable comonomers of group (b) are for example monoethylenically unsaturated $C_3$–$C_6$-carboxylic acids and the esters, amides and nitriles thereof. Specific compounds of this kind are for example acrylic acid, methacrylic acid, crotonic acid, amleic acid or anhydride, fumaric acid, itaconic acid or anhydride, methyl acrylate, ethyl acrylate, methyl methacrylate, butyl methacrylate, dimethylaminoethyl acrylate, dimethylaminoethyl methacrylate, monoethyl maleate, diethyl maleate, hydroxyethyl acrylate, hydroxypropyl acrylate, hydroxyethyl methacrylate, hydroxypropyl methacrylate, methacrylamidopryopyldimethylammonium chloride, dimethylaminopropylacrylamide, acrylonitrile and methacrylonitrile. It is also possible to use sulfo-containing monomers such as vinylsulfonic acid, allylsulfonic acid, methallylsulfonic acid, styrenesulfonic acid, 3-sulfopropyl acrylate, 3-sulfopropyl methacrylate and acrylaminomethylpropanesulfonic acid. It is also possible to use N-vinylmethylimidzaole, N-vinylcaprolactam, N-vinylimidazole, N-vinylmethylimidazole, N-vinylcaprolactam, N-vinylimidazole, N-vinylmethylimidazole, N-vinyl-2-methylimidazole, vinyl acetate, vinyl propionate, vinyl butyrate, styrene, olefins of from 2 to 10 carbon atoms, such as ethylene, propylene, isobutylene, hexene or diisobutene, vinyl alkyl ethers, such as methyl vinyl ether, ethyl vinyl ether, n-butyl vinyl ether, isobutyl vinyl ether, hexyl vinyl ether and octyl vinyl ether, and also mixtures thereof. Various ethylenically unsaturated monomers which contain carboxyl or sulfo groups may be polymerized in particular from aqueous solution, in a partially or completely neutralized form. Neutralization is preferably effected using alkali metal bases, such as sodium hydroxide solution and potassium hydroxide solution, ammonia or amines, eg. trimethylamine, ethanolamine or etrithanolamine. The basic monomers are preferably used in the form of their salts with mineral acids, eg. hydrochloric acid, sulfuric acid, or in quaternized form (suitable quaternizing agents being for example dimethyl sulfate, diethyl sulfate, methyl chloride, ethyl chloride and benzyl chloride).

The copolymers preferably contain (a) from 95 to 5 mol % of N-vinylformamide and (b) from 5 to 95 mol % of an unsaturated monomer selected from the group consisting of vinyl acetate, $C_1$–$C_4$-alkyl vinyl ethers, N-vinylpyrrolidone, N-vinylcaprolactam, monoethylenically unsaturated $C_3$–$C_6$-carboxylic acids, the esters and nitriles thereof, and also, if available, anhydrides of acrylic acid, methacrylic acid, maleic acid and itaconic acid, and mixtures thereof. The copolymers contain at least 1, preferably 5, mol % of N-vinylformamide or another monomer of group (a) as copolymerized units. The copolymers contain the monomers of group (b) in amounts of up to 99, preferably from 5 to 95, mol %.

The polymerization may also include a further group of monomers (c) which contain at least 2 ethylenically unsaturated double bonds in the molecule. The compounds in question here are crosslinkers, for example methylenebisacrylamide, N,N'-divinylethyleneurea, N,N'-divinylpropyleneurea, ethylidenebis-3-vinylpyrrolidone, acrylic, methacrylic and maleic esters of dihydric or polyhydric alcohols, eg. ethylene glycol diacrylate, butylene glycol diacrylate, ethylene glycol dimethacrylate and trimethylolpropane triacrylate. Further suitable esters of this kind are obtained for example on esterifying polyhydric alcohols, eg. glycol, glycerol, pentaerythritol, glucose, fructose, sucrose, polyalkylene glycols of molecular weight 400–6,000 and polyglycerols of molecular weight 126–368, with acrylic acid, methacrylic acid or maleic acid using at least 2 mol of one of the unsaturated carboxylic acids mentioned per mole of the alcohol used. There are other possibilities, in particular, if the polymerization is to be carried out in an organic solvent: divinylbenzene, divinyldioxane, divinyl adipate, divinyl phthalate, pentaerythritol triallyl ether, pentallylsucrose, diallyl ethers and divinyl ethers of polyalkylene glycols of molecular weight 400–6,000, ethylene glycol divinyl ether, butanediol divinyl ether and hexanediol divinyl ether. If the polymers obtained are to be copolymerized with water-soluble monomers to give water-soluble or strongly swellable polymers, it is preferable to use water-soluble cross-linkers in amounts of from 100 to 2000 ppm. If, however, the polymers are to be water-insoluble or only slightly swellable the crosslinkers are used in amounts of about 0.001–10 mol %, preferably up to 5%, based on the monomers used.

The homopolymers and copolymers can be prepared by the known methods of bulk, solution, precipitation, suspension and emulsion polymerization. The N-vinylamides are copolymerized with the comonomers (b) and (c) in the presence of initiators which form free radicals under polymerization conditions, for example in the presence of peroxides, hydroperoxides, hydrogen peroxide, persulfates, azo compounds or redox catalysts.

Preferred free radical initiators are all those compounds which have a half life of less than 3 hours at the particular polymerization temperature chosen. If the polymerization is initiated at a low temperature and completed at a higher temperature, it is advisable to use at least two initiators which decompose at different temperatures, namely an initiator which decomposes at low temperature at the start of polymerization and then an initiator which decomposes at a higher temperature for the main part of the polymerization. It is possible to use water-soluble initiators, water-insoluble initiators and mixtures of the two. The water-insoluble initiators will then be soluble in the organic phase. Suitable initiators for particular temperature ranges are for example as follows:

40–60° C.: acetylcyclohexanesulfonyl peroxide, diacetyl peroxydicarbonate, dicyclohexyl peroxydicarbonate, di-2-ethylhexyl peroxydicarbonate, tert-butyl perneodecanoate, 2,2'-azobis (4-methoxide-2,4-dimethylvaleronitrile), 2,2'-azobis (2-methyl-N-phenylpropionamidine) dihydrochloride, 2,2'-azobis (2-methylpropionamidine) dihydrochloride.

60–80° C.: tert-butyl perpivalate, dioctanoyl peroxide, dilauroyl peroxide, 2,2'-azobis (2,4-dimethylvaleronitrile).

80–100° C.: dibenzoyl peroxide, tert-butyl per-2-ethylhexanoate, tert-butyl permaleate, 2,2-azobis (isobutyronitrile), dimethyl 2,2'-azobisisobutyrate.

100–120° C.: bis (tert-butylperoxy) cyclohexane, tert-butyl peroxyisopropylcarbonate, tert-butyl peracetate.

120–140° C.: 2,2-bis (tert-butylperoxy)butane, dicumyl peroxide, di-tert-amyl peroxide, di-tert-butyl peroxide.

>140° C.: p-methane hydroperoxide, penane hydroperoxide, cumene hydroperoxide, tert-butyl hydroperoxide.

By also using salts or complexes of heavy metals, for example salts of copper, cobalt, manganese, iron, nickel or chromium, or organic compounds such as benzoin, dimethylaniline or ascorbic acid together with at least one of the abovementioned initiators, it is possible to reduce the half lives of the free radical initiators mentioned. For instance, tert-butyl hydroperoxide can be activated by the addition of 5 ppm of copper (II) acetyl-acetonate in such a way that polymerization becomes possible at as low as 100° C. The reducing components of the redox catalysts may also be formed for example by compounds such as sodium sulfite, sodium bisulfite, sodium formaldehydesulfoxylate and hydrazine. A polymerization initiator or a mixture of a plurality of polymerization initiators is used in an amount of from 0.01 to 10%, preferably from 0.05 to 5%, based on the monomers used in the polymerization. Redox components are used in an amount of from 0.01 to 5% of the reducing compound. Heavy metals are used within the range from 0.1 to 100 ppm, preferably from 0.5 to 10 ppm. It is frequently of advantage to use a combination of peroxide, reducing agent and heavy metal as redox catalyst. It is also possible to prepare the polymers by polymerization under UV light using UV initiators. These UV initiators are the usual photoinitiators and seensitizers for this purpose. They are for example alpha-ketaldonyl alcohols, such as benzoin and benzoin ethers, alpha-substituted benzoin compounds, such as alpha-methylolbenzoin and alpha-methylolbenzoin ethers, alpha-methylolbenzoin and alpha-phenylbenzoin. It is also possible to use triplet sensitizers. The preferred UV initiators are benzyl diketals. The UV light sources used are for example not only high-energy UV lamps, such as carbon arc lamps, mercury vapor lamps, xenon lamps or fluorescent tubes, but also low-UV sources, such as fluorescent tubes having high blue content.

Homopolymers of N-vinylamides and copolymers with N-vinyllactams and vinyl alkyl ethers can also be prepared using cationic initiators such as Lewis acids (eg. boron fluoride etherate). The polymerization may be carried out in the presence of regulators. Suitable regulators are for example mercapto compounds, such as mercaptoethanol, mercaptopropanol, mercaptobutanol, mercaptoacetic acid, mercaptopropionic acid, butylmercaptan and dodecylmercaptan, also allyl compounds such as allyl alcohol, aldehydes such as acetaldehyde, propionaldehyde, n-butyraldehyde and isobutyraldehyde, and also formic acid and hydroxylamine. If the polymerization is carried out in the presence of regulators, they are required in an amount of from 0.05 to 10% by weight, based on the monomers used in the polymerization.

In bulk polymerization, the monomers are heated together with the free radical formers, usually to above the softening point in order that the reaction mixture may be kept fluid. The polymers obtained usually have a small k value. High molecular weight or crosslinked polymers are preferably prepared by precipitation, suspension or emulsion polymerization. In the case of precipitation polymerization, the monomers are soluble in the diluent, and the polymers formed are insoluble therein and precipitate. In the case of suspension polymerization, the monomers as well as the polymers are insoluble in the diluent. To prevent coalescence of the polymer particles, it is advisable to employ a protective colloid. An advantageous method for forming finely divided polymers is reverse suspension polymerization. N-Vinylamide polymers can also be prepared by emulsioon polymerization, specifically water-in-oil emulsion polymerization. Solution polymerization is preferably employed for preparing polymers having a low or medium molecular weight. The method of choice for preparing the preferably water-soluble polymers is solution polymerization. A particularly suitable method for preparing insoluble polymers is popcorn polymerization. Polymerization is particularly smooth with N-vinylformamide with or without N-vinylpyrrolidone, N-vinylcaprolactam, arylamide and acrylic acid. In a preferred embodiment, said monomers are heated in the form of 5–50% strength solutions in the presence of from 0.5 to 5% of polyfunctional monomer for several hours in a slow stream of nitrogen in the absence of a free radical initiator. The fine particles of precipitated polymer are then isolated by filtration and can thereafter be subjected to phosphonomethylation.

The polymerization techniques mentioned are carried out at 20–180° C., preferably 40–150° C., with concentrations of 5–80% by weight, preferably 10–60% by weight. To prepare the low molecular weight water-soluble copolymers particularly suitable for phosphonomethylation, use is made of solution polymerization. Particularly suitable solvents for the purpose are: water, methanol, ethanol, n-propanol, isopropanol, butanol, tetrahydrofuran and dioxane. If copolymers of n-vinyl-formamide are to be prepared, it is preferable to use those comonomers which produce copolymers which following phosphonomethylation are water-soluble, at least in the form of the alkali metal or ammonium salts. Particularly suitable comonomers for this purpose are: N-vinyl-pyrrolidone, acrylic acid, methacrylic acid, maleic acid oreanhydride, acrylamide, arylamidomethylpropane-sulfoneic acid, vinyl acetate and methyl acrylate.

The polymers which are to be phosphonomethylated can be water-soluble or else water-insoluble. However, they can also be swellable in water without being soluble therein. Such polymers contain a monomer of group (c) as copolymerized units. Since such polymers do not dissolve in water, it is not possible to determine a k value for them. The water-soluble polymers have k values of at least 8, preferably from 10 to 250. This k value range also applies to uncrosslinked polymers which are insoluble in water. The k values of these polymers are then determined in an organic solvent, eg. tetrahydrofuran. Of particular practical interest are polymers having k values of from 10 to 200.

The phosphonomethylation can be carried out by first setting free the amine groups of the polymers by hydrolysis of the amide groups. This can be done by acid or alkali catalysis and takes place in a conventional manner, preferably by means of acid catalysis, preferably in turn with the aid of mineral acids such as hydrochloric acid, phosphoric acid or dilute sulfuric acid. The hydrolysis can be carried out not only in a separate, preceding stage but also in one operation together with the phosphonomethylation which is carried out under strongly mineral acid conditions in any case. Hydrolysis and phosphonomethylation are effected by reacting the compounds of the formula II with formaldehyde and phosphorous acid in a strongly acid medium, usually in the presence of hydrochloric acid (cf. k. moedritzer and R. R. Irani, J. Org. Chem. 31 (1966), 1603, and D. Redmore, Top. Phosphorus Chem. 8 (1976), 515). The pH of the reaction mixture is from 0 to 4, preferably from 0 to 2.

The reaction times for the polymeric compounds described herein vary with the type of polymer within the range from 5 to 20 hours, preferably from 10 to 15 hours. This generally produces the completelyphosphonomethy-lated amines. If substoichiometric amounts of formaldehyde and phosphorous acid are applied to polyfunctional amines, the products are in general mixtures in which the amino functions may not only have been singly or doubly phosphonomethylated but may in some instances also be unsubstituted. If, therefore, complete conversion is desired, it is advisable to use the other reactants in such an excess relative to the stoichiometry of the polymers which contain units of the formula II or the polymers formed by hydrolysis, which then contain units of the formula III, as to ensure exhaustive phosphonomethylation. However, it is possible tophosphonomethylate the units II or III of the polymers only incompletely, for example to 10, 20 of the [sic] 50%.

The workup after phosphonomethylation can be carried out as follows:

First the reaction mixture, which contains hydrochloric acid, is treated with steam for from 1 to 5 hours to drive off excess acids and also volatile by-products and excess starting materials. In certain cases the products are immediately unable in the form of these aqueous solutions or else after concentrating. It may also be of advantage here to subject the products before use to an additional purification.

To this end, the mixture obtained from the steam treatment is concentrated, for example by evaporation. The resulting solutions, which in some cases are very viscous, are used for preparing the corresponding alkali metal salts from the acids. This is done for example by neutralizing the concentrated solutions or mixtures with aqueous solutions of alkali metal hydroxides. The polymers can then be obtained in good purity in the form of their alkali metal salts by precipitation from suitable solvents, eg. methanol. It is also possible to introduce the concentrated solutions while still acid into a methanolic alkali metal hydroxide solution in a suitable manner, thereby simultaneously neutralizing the acids to give alkali metal salts and precipitating the latter.

The insoluble, crosslinked polymers are suitable for use as ion exchange materials, and the slightly crosslinked and still strongly swellable polymers find use as thickeners for the textile, dispersion and cosmetics sectors. High molecular weight polymers are usable as flocculants and retention aids for the water treatment and paper sectors and as strength enhancers for paper. Of particular importance are the medium and low molecular weight polymers having k values of from 10 to 100 for use as additives for the detergent sector and as dispersants (antiscalants) for the water treatment sector.

The copolymers act as antiscalants in water treatment in that they inhibit the formation of crystals of hardness salts and hydroxides, such as calcium carbonate, magnesium oxide, magnesium carbonate, calcium sulfate, barium sulfate, strontium sulfate, calcium phosphate (apatite) and the like, in the substoichiometric dosage range or affect the formation of these precipitates in such a way as to prevent the formation of hard and rocklike deposits and favor the formation of readily resuspendable, finely divided particles. In this way the surfaces of, for example, heat exchangers, pipes and pump elements are kept free of scale and more effectively protected from corrosion. In particular, the danger of pitted corrosion underneath the scale is prevented. Furthermore, the growth of microorganisms on these metal surfaces is inhibited. By using antiscalants it is possible to prolong the life of such equipment. In addition, the shutdown time required for the cleaning of equipment is considerably reduced.

The amount of antiscalant required for this purpose is only from 0.1 to 100 ppm, based on the particular aqueous medium to be treated. The water-carrying systems are for example open or closed cooling cycles, for example of power stations or chemical plants, such as reactors, distillation apparatus and the like where heat must be removed. The antiscalants can also be used in boiler waters and steam generators, preferably within the range of water temperatures below 150° C. Another preferred use of the phosphonomethylated polyvinylamines to be used according to the present invention is the desalting of seawater and brackish water by distillation or membrane processes, eg. reverse osmosis or electrodiarlysis. For instance, in the multistage flash evaporation process for seawater desalination, where concentrated seawater is recirculated at elevated temperature, antiscalants are effective in inhibiting the precipitation of hardness ions, for example as brucite, and their buildup on parts of the equipment.

In membrane processes, membrane damage due to crystalline hardness precipitates can be effectively prevented. Antiscalants thus permit higher concentration factors, an improved yield of freshwater and a longer membrane life. A further use of antiscalants is for example the concentrating of cane or sugar beet. In contradistinction to the above-described applications, the dilute sugar juice is treated with purifying additives, eg. calcium hydroxide, carbon dioxide, sulfur dioxide or possibly phosphoric acid. Sparingly soluble calcium salts which remain in the sugar juice following clarification, eg. calcium carbonate, calcium sulfate or calcium phosphate, then precipitate during the process of evaporation and may form rock hard coatings on heat exchanger surfaces. This also applies to nonsucrose constituents of sugar juice, such as silica or calcium salts of organic acids, eg. calcium oxalate.

The same is true of downstream processing following sugar production, for example the production of alcohol from sugar production residues.

The phosphonomethylated polyvinylamines usable according to the present invention as antiscalants are capable of substantially suppressing the abovementioned scale formation processes, so that shutdown times for cleaning the plant, for example by boiling out, can be significantly reduced. Another essential aspect here is the prodigious energy sparing effect due to avoidance of the thermally insulating coatings mentioned.

The amounts of antiscalant required in the applications described vary, but range from 0.1 to 100 ppm, based on the aqueous medium to be treated, such as the cooling, boiler or process water used or for example sugar juice.

Hitherto the antiscalants used have been in the main, inter alia, low molecular weight phosphonates (nitrilotrismethylenephosphonic acid, ethylenediaminetetramethylenephosphonic acid, hexamethylenediaminetetramethylenephosphonic acid, diethylenetriaminepentamethylenephosphonic acid, hydroxyethanediphosphonic acid and others). Their chief disadvantage is that they precipitate in the form of their calcium salts at the high calcium concentrations frequently encountered in practice and that they are incompletely eliminated or mineralized in water treatment plants.

The above-recited phosphonomethylated polyvinylamines, by contrast, are more compatible with calcium ions (see Test of calcium ion compatibility) and, owing to their higher molecular weights, and more effectively absorbed on the sewage sludge. Compared with the phosphorus-free polymers used in practice, they have the advantage of better analyzability in the ppm range, as a result of which they can be used economically.

A further important application of the phosphonomethylated polyvinylamines is their use in detergent compositions. There they act for example as builders, complexing agents, bleach stabilizers and incrustation inhibitors. Detergent compositions, as will be known, include as ingredients not only surfactants but also builders and complexing agents.

Builders perform various functions in detergent formulations. For instance, they should enhance the soil detaching effect of surfactants, they should render the hardness components of the water harmless, whether by sequestration of the alkaline earth metal ions or by dispersing the hardness ions precipitated from the water, they should promote the dispersion and stabilization of the colloidal soil particles in the wash liquor, and they should act as buffers to maintain the optium pH during the wash. In solid detergent formulations, builders should make a positive contribution to a good powder structure and free flow. Phosphate-based builders are highly successful for meeting the above-described builder requirements. Thus, pentasodium triphosphate was for long without question the most important builder in detergent compositions. However, the phosphates in detergents pass virtually unchanged into the effluent. Since phosphates are a good nutrient for water plants and algae, they are responsible for the eutrophication of lakes and slow-flowing waters. Water treatment plants which do not possess a third treatment stage, specifically for phosphate precipitation, are not sufficiently efficient in removing them. A search for a replacement for phosphate builders in detergents has therefore been in progress for a long time.

For instance, phosphate-free or low-phosphate detergents have become available in the meantime based on water-soluble ion exchange materials made of zeolites. However, owing to their specific properties, zeolites alone cannot replace phosphates as builders. Zeolites are supported in their effect by other detergent additives comprising carboxyl-containing compounds, such as citric acid, tartaric acid, nitrilotriacetic acid and in particular polymeric carboxyl-containing compounds and salts thereof. Of the last-mentioned compounds, the homopolymers of acrylic acid and the copolymers of acrylic acid and maleic acid are of particular importance as detergent additives; cf. U.S. Pat. No. 3,308,067 and EP Patent 25.551.

Complexing agents are used in detergent compositions in order to control the level of free heavy metal ions in the compositions themselves and in the wash liquors. The amount used as complexing agent is advantageously from 0.1 to 2% by weight, based on the total weight of the detergent formulation as a whole. They also have an advantageous bleach-stabilizing effect, for example for sodium perborate, in detergent compositions and the bleaching of textiles, cellulose or paper stock. Traces of heavy metals such as iron, copper and manganese occur in the washing powder itself, in the water and in the textile material and catalyze the decomposition of the sodium perborate. The complexing agents used bind these metal ions and thereby prevent the undesirable decomposition of the bleaching system during storage and in the wash liquor. This increases the efficiency of the bleaching system and reduces fiber damage.

The two functions have hitherto been performed by different classes of substrates. The builder function was performed by carboxyl-containing polymers as described for example in U.S. Pat. No. 3,308,067 and EP Patent 25,551. The bleach-stabilizing function of the complexing agents was performed by products such as ethylenediaminetetraacetic acid (EDTA), ethylenediaminetetramethylenephosphonic acid (EDTMPA), propylenediaminetetraacetic acid (PDTA), hydroxypropylenediaminetetraacetic acid (HPDTA), hydroxyethanediphosphonic acid, diethylenetriaminetetraacetic acid, diethylenetriaminetetramethylenephosphonic acid, hydroxyethyliminodiacetic acid, hydroxyethylenediaminetriacetic acid, diethylenetriaminepentaacetic acid and also, for example, diethanolglycine, entanolglycine, citric acid, glucoheptonic acid or tartaric acid, as mentioned for example under the heading of Waschmittel ('Detergents') in Ullmann's Encyklopädie der technischen Chemie, 4th edition, volume 24, pp. 63–160, in particular pp. 91–96, Verlag Chemie,Weinheim, 1983.

The polymers according to the present invention make it possible to obtain a builder effect and a bleach stabilizer effect with a single product.

The compounds according to the present invention may also be included as builders and bleach stabilizers in detergent formulations together with other, prior art substances, in which case it may be possible in certain circumstances to improve the general properties in respect of sequestration, incrustation inhibition and bleaching effect to a considerable extent.

In what follows, customary constituents of detergent formulations, bearing in mind the general directions given above, will be recited by way of example:

Suitable surfactants are those which contain in the molecule at least one hydrophobic organic radical and a water-solubilizing anionic, zwitterionic or nonionic group. The hydrophobic radical is usually an aliphatic hydrocarbon radical of from 8 to 26, preferably from 10 to 22, in particular from 12 to 18, carbon atoms or an alkylaromatic radical having from 6 to 18, preferably from 8 to 18, aliphatic carbon atoms.

Suitable synthetic anionic surfactants are in particular those of the type of the sulfonates, sulfates or synthetic carboxylates.

Suitable surfactants of the sulfonate type are alkylbenzenesulfonates having from 4 to 15 carbon atoms in the alkyl, mixtures of alkene- and hydroxyalkanesulfonates and also disulfonates as obtained for example from monoolefins having a terminal or internal double bond by sulfonation with gaseous sulfur trioxide and subsequent alkaline or acid hydrolysis of the sulfonation products. It is also possible to use alkanesulfonates which are obtainable from alkanes by chlorosulfonation or sulfoxidation and subsequent hydrolysis or neutralization or by bisulfite addition to olefins. Further usable sufactants of the sulfonate type are the esters of α-sulfo fatty acids, for example the α-sulfonic acids of hydrogenated methyl or ethyl esters of coco, palm kernel or tallow fatty acid.

Suitable surfactants of the sulfate type are the sulfuric monoesters of primary alcohols, for example from coco fatty alcohols, tallow fatty alcohols or oleyl alcohol, and those of secondary alcohols. It is also possible to use sulfated fatty acid alkanolamines, fatty acid monoglycerides or reaction products of from 1 to 4 mol of ethylene oxide with primary or secondary fatty alcohols or alkylphenols.

Further suitable anionics are the fatty acid esters of amides of hydroxy- or amino-carboxylic acids or -sulfonic acids, eg. the fatty acid sarcosides, glycolates, lactates, taurides or isothionates [sic].

Anionic surfactants can be present in the form of their sodium or potassium or ammonium salts or as soluble salts of organic bases, such as mono-, di- or triethanolamine. Ordinary soaps, ie. salts of natural fatty acids, should not be left unmentioned.

Usable nonionics are for example addition products of from 3 to 40, preferably 4 to 20, mol of ethylene oxide with 1 mol of fatty alcohol, alkylphenol, fatty acid, fatty amine, fatty acid amide or alkanesulfonamide. Of particular importance are the addition products of from 5 to 16 mol of ethylene oxide with coco or tallow fatty alcohols, with oleyl alcohol or with synthetic alcohols of from 8 to 18, preferably from 12 to 18, carbon atoms, and with mono- or dialkylphenols having from 6 to 14 carbon atoms in the alkyl moieties. Besides these water-soluble nonionics, however, it is also possible to use water-insoluble or incompletely water-soluble polyglycol ethers having from 1 to 4 ethylene glycol ether radicals in the molecule, in particular if combined with water-soluble nonionic or anionic surfactants.

Other suitable nonionics are the water-soluble addition products of ethylene oxide with polypropylene glycol ethers, alkylenediaminopolypropylene glycol and alkylpolypropylene glycols having from 1 to 10 carbon atoms in the alkyl chain which contain from 20 to 250 ethylene glycol ether groups and from 10 to 100 polypropylene glycol ether groups, the latter acting as the hydrophobic entity.

It is also possible to use nonionics of the type of the amine oxides or sulfoxides.

The foaming power of the surfactants can be increased or reduced by combining suitable types of surfactants. A reduction is also possible by adding organic non-surfactants. The surfactants account for from 5 to 45 [lacuna] of a detergent formulation.

Suitable builder substances are for example: wash alkalis, such as sodium carbonate and sodium silicate, complexing agents, such as phosphates, ion exchange materials, such as zeolites, and mixtures thereof. They are intended to eliminate the hardness ions, which come partly from the water, partly from the soil or the textile material, and to augment the surfactant action. In addition to the abovementioned builder substances, the builder component may also contain cobuilders. Cobuilders are included in modern detergents to provide some of the functions of phosphates, eg. sequestration, soil antiredeposition, and primary and secondary detergency.

The builder component may contain for example water-insoluble silicates, as described for example in DE-A-2,412,837, and/or phosphates. The group of usable phosphates includes pyrophosphate, triphosphate, higher polyphosphates and metaphosphates. It is also possible to use phosphorus-containing organic complexing agents, such as alkanepolyphosphonic acids, amino- and hydroxyalkanepolyphosphonic acids and phosphonocarboxylic acids. Examples of such detergent additives are: methanediphosphonic acid, propane-1,2,3-triphosphonic acid, butane-1,2,3,4-tetraphosphonic acid, polyvinylphosphonic acid, 1-aminoethane-1,1-diphosphonic acid, 1-amino-1-phenyl-1,1-diphosphonic acid, aminotrismethylenetriphosphonic acid, methylamino- or ethylamino-bismethylenediphosphonic acid, ethylenediaminotetramethylenetetraphosphonic acid, diethylenetriaminopentamethylenepentaphosphonic acid, 1-hydroxyethane-1,1-diphosphonic acid, phosphonoacetic and phosphonopropionic acids, copolymers of vinylphosphonic acid and acrylic and/or maleic acid, and the partly or wholly neutralized salts thereof.

Further organic compounds which act as complexing agents for calcium ions and can be present in detergent formulations are polycarboxylic acids, hydroxycarboxylic acids and aminocarboxylic acids, which are usually used in the form of their water-soluble salts.

Examples of polycarboxylic acids are dicarboxylic acids of the general formula HOOC—$(CH_2)_m$—COOH where m is from 0 to 8 and also maleic acid, methylenemalonic acid, citraconic acid, mesaconic acid, itaconic acid, noncyclic polycarboxylic acids having at least 3 carboxyl groups in the molecule, eg. tricarballylic acid, aconitic acid, ethylenetetracarboxylic acid, 1,1,3-propanetetracarboxylic acid, 1,1,3,3,5,5-pentanehexacarboxylic acid, hexanehexacarboxylic acid, cyclic or di- or polycarboxylic acids, eg. cyclopentanetetracarboxylic acid, cyclohexanehexacarboxylic acid, tetrahydrofurantetracarboxylic acid, phthalic acid, terephthalic acid, benzenetri-, -tetra- or -pentacarboxylic acid and also mellitic acid.

Examples of hydroxymonocarboxylic or hydroxypolycarboxylic acids are glycolic acid, lactic acid, malic acid, tartronic acid, methyltartronic acid, gluconic acid, glyceric acid, citric acid, tartaric acid and salicylic acid.

Examples of aminocarboxylic acids are glycine, glycylglycine, alanine, aspargine, glutamic acid, aminobenzoic acid, iminodiactetic and iminotriacetic acids, hydroxyethyliminodiacetic acid, ethylenediaminotetraacetic acid, hydroxyethylethylenediaminetriacetic acid, diethylenetriaminepentaacetic acid and higher homologs which can be prepared by polymerization of an N-aziridiylcarboxylic acid derivative, for example of acetic acid, succinic acid or tricarballylic acid, and subsequent hydrolysis, or by condensation of polyamines having a molecular weight of from 500 to 10,000 with chloroacetate or bromoacetate salts.

The cobuilder substances used are preferably polymeric carboxylic acids. These polymeric carboxylic acids include the carboxymethyl ethers of sugar, of starch and of cellulose.

Particularly important polymeric carboxylic acids are for example polymers of acrylic acid, maleic acids, itaconic acid, mesaconic acid, aconitic acid, methylenemalonic acid, citraconic acid and the like, the copolymers between the abovementioned carboxylic acids, for example the copolymer of acrylic acid and maleic acid in a ratio of 70:30 and having a molecular weight of 70,000, or with ethylenically unsaturated compounds, such as ethylene, propylene, isobutylene, vinyl alcohol, vinyl methyl ether, furan, acrolein, vinyl acetate, acrylamide, acrylonitrile, methacrylic acid, crotonic acid, etc., eg. the 1:1 copolymers of maleic anhydride and methyl vinyl ether of molecular weight 70,000 or the copolymers of maleic anhydride and ethylene and propylene or furan.

The cobuilder component may also include soil antiredeposition agents which keep the soil which has been detached from the fiber in suspension in the liquor and thus inhibit the graying of the textile. Suitable for this purpose are water-soluble colloids, usually of the organic kind, such as the water-soluble salts of polymeric carboxylic acids, glue, gelatin, salts of ethercarboxylic acids or ethersulfonic acids of starch or of cellulose or salts of acid sulfuric esters of cellulose or of starch. It is also possible to use for this purpose water-soluble polyamides which contain acid groups. It is further possible to use soluble starch products and also starch products other than those mentioned above, for example degraded starch, aldehyde starches, etc Polyvinylpyrrolidone is also usable.

Bleaching agents are in particular hydrogen peroxide and derivatives thereof or active chlorine donor compounds. Particularly important bleaching agents which supply $H_2O_2$ in water are sodium perborate hydrates, such as $NaBO_3 \cdot 4H_2O$. However, it is also possible to use other $H_2O_2$-providing borates. These compounds can be replaced as a whole or in part by other active oxygen carriers, in particular by peroxyhydrate, such as peroxycarbonates, peroxyphosphonates, citrate perhydrates, urea-$H_2O_2$ or melamine-$H_2O_2$ compounds and by $H_2O_2$-providing peracid salts, such as caroates, perbenzoates or peroxyphthalates.

In addition to the novel stabilizers for peroxy compounds it is possible to incorporate customary water-soluble and/or water-insoluble stabilizers for peroxy compounds together with the latter in amounts of from 0.25 to 10% by weight, based on the peroxy compound. Suitable water-insoluble stabilizers are the magnesium silicates $MgO:SiO_2$ in a ratio of from 4:1 to 1:4, preferably from 2:1 to 1:2, in particular 1:1, which are usually obtained by precipitation from aqueous solutions. Instead, it is also possible to use other alkaline earth metals of appropriate composition.

To achieve a satisfactory bleaching effect at wash temperatures below 80° C., in particular within range from 60 to 40° C., it is advantageous to incorporate bleach activators in the detergent formulation, advantageously in an amount of from 0.5 to 5% by weight, based on the detergent formulation.

Activators for percompounds which provide $H_2O_2$ in water are certain N-acyl and O-acyl compounds which form organic peracids with $H_2O_2$, in particular acetyl, propionyl or benzoyl compounds, and also carbonic and pyrocarbonic esters. Usable compounds include inter alia:

N-diacylated and N,N'-tetraacylated amines, eg.
N,N,N',N'-tetraacetyl-methylenediamine or -ethylenediamine,
N,N-diacetylaniline and N,N-diacetyl-p-toluidine or 1,3-diacylated hydantoins,
alkyl-N-sulfonylcarboxamides,
N-acylated cyclic hydrazides, acylated triazoles or urazoles, eg. monoacetylmaleohydrazide,
O,N,N-trisubstituted hydroxylamines, eg.
O-benzoyl-N,N-succinylhydroxylamine,
O-acetyl-N,N-succinylhydroxylamine,
O-p-methoxybenzoyl-N,N-succinylhydroxylamine,
O-p-nitrobenzoyl-N,N-succinylhydroxylamine and
O,N,N-triacetylhydroxyamine,
carboxylic anhydrides, eg.
benzoic anhydride,
m-chlorobenzoic anhydride,
phthalic anhydride, 4-chlorophthalic anhydride,
sugar esters, eg. glucose pentaacetate,
imidazolidine derivatives, such as
1,3-diformyl-4,5-diacetoxyimidazolidine,
1,3-diacetyl-4,5-diacetoxyimidazolidine,
1,3-diacetyl-4,5-di-propionyloxyimidazolidine,
acylated glycolurils, eg.
tetrapropionylglycoluril or
diacetyldibenzoylglycoluril,
dialkylated, 2,5-diketopiperazine, eg.
1,4-diacetyl-2,5-diketopiperazine,
1,4-dipropionyl-2,5-diketopiperazone,
1,4-dipropionyl-3,6-dimethyl-2,5-diketopiperazine,
acetylation and benzoylation products of propylenediurea or 2,2-dimethylpropylenediurea,
the sodium salt of p-(ethoxycarbonyloxy)benzoic acid and p-(propoxycarbonyloxy)benzenesulfonic acid and also the sodium salts of alkylated or acylated phenolsulfonic esters, such as p-acetoxybenzenesulfonic acid, 2-acetoxy-5-nonylbenzenesulfonic acid, 2-acetoxy-5-propylbenzenesulfonic acid or of isononanoyloxyphenyl sulfonic acid.

The bleaching agents used can also be active chlorine compounds of the inorganic or organic kind. Inorganic active chlorine compounds include alkali metal hypochlorites which may be used in particular in the form of their mixed salts or addition compounds with orthophosphates or condensed phosphates, for example with pyro- and polyphosphates, or with alkali metal silicates. If the detergent formulations and auxiliaries contain monopersulfates and chlorides, active chlorine forms in aqueous solution.

Suitable organic active chlorine compounds are in particular the N-chlorine compounds in which one or two chlorine atoms are bonded to a nitrogen atom and the third valence of the nitrogen atoms preferably leads to a negative group, in particular to a CO or $SO_2$ group. These compounds include dichloro- and trichlorocyanuric acids and salts thereof, chlorinated alkylguanides or alkylbiguanides, chlorinated hydantoins and chlorinated melamines.

Examples of additional auxiliary substances are:

Foam regulators comprising, especially if surfactants of the sulfonate or sulfate type are used, surface-active carboxy- or sulfo-betaines and also the abovementioned nonionics of the alkylolamide type. It is also possible to use fatty alcohols or higher terminal diols for this purpose.

A reduced level of foam, which is desirable in particular for machine washing, is frequently obtained by combining the various types of surfactant, for example sulfates and/or sulfonates with nonionics and/or with soaps. In the case of soaps, the degree of foam suppression increases with the degree of saturation and the number of carbons of the fatty acid ester; soaps of saturated $C_{20}$–$C_{24}$-fatty acids are therefore particularly suitable for use as foam suppressants.

Non-surfactant foam inhibitors include N-alkylated aminotriazines which are obtained by reacting 1 mol of cyanuric chloride with from 2 to 3 mol of a mono- and/or dialkylamine having from 6 to 20, preferably 8 to 18, carbon atoms in the alkyl moiety and which may contain chlorine. The same effect is produced by propoxylated and/or butoxylated aminotriazines, for example products obtained by adding from 5 to 10 mol of propylene oxide to 1 mol of melamine and by adding from 10 to 50 mol of butylene oxide to this propylene oxide derivative.

Other suitable non-surfactant foam inhibitors are water-insoluble organic compounds, such as paraffins or haloparaffins having melting points below 100° C., aliphatic $C_{18}$–$C_{40}$-ketones and also aliphatic carboxylic esters which contain at least 18 carbon atoms in the acid or alcohol moiety, possibly in each (for example triglycerides or fatty acid fatty alcohol esters); they can be used as antifoams in particular in the case of combinations of surfactants of the sulfate and/or sulfonate type with soaps.

The detergent compositions may contain fluorescent whitening agents for cotton, polyamide, polyacrylonitrile or polyester fabrics. Suitable fluorescent whitening agents are for example derivatives of diaminostilbenedisulfonic acid for cotton, derivatives of 1,3-diarylpyrazolines for polyamide and quaternary salts of 7-methoxy-2-benzimidazol-2'-ylbenzofuran or of derivatives of the 7-(1',2',5'-triazol-1'-yl)-3-(1",2",4"-triazol-1"-yl)coumarins for polyacrylonitrile. Fluorescent whitening agents suitable for polyester are for example compounds from the class of the substituted styrils [sic], ethylenes, thiophenes, naphthalenedicarboxylic acids or derivatives thereof, stilbenes coumarins and naphthalimides. Fluorescent whitening agents may be present in the detergent formulation in an amount of up to 1% by weight.

The soluble phosphonomethylated polyvinylamines have K values of from 8 to 300, preferably from 9 to 200, particularly preferably from 10 to 80. The K values are determined by the method of H. Fikentscher on 1% strength solutions at 25° C. [cf. Zellulosechemie 13 (1932), 58–64 and 71–74; $K=k\times10^3$]. In the case of water-soluble polymers the NaOH-neutralized polymer is measured in the form of a solution in water at pH 7.0. If the K value determination was carried out in another solvent, this is stated in the Examples. The percentages are by weight.

Preparation of polymers

Polymer 1

In a 2-1 capacity stirred reactor equipped with a condenser, a thermometer, feed means, and a nitrogen inlet and outlet, 500 g of isopropanol are heated to the boil and admixed in the course of 3 hours with 270.4 g of 100% strength acrylic acid, 29.6 g of N-vinylformamide dissolved in 100 g of isopropanol and a solution of 9 g of tert-butyl perethylhexanoate in 100 g of isopropanol added at a uniform rate at the boil (about 82° C.). This is followed by a further 2 hours of heating at the boil, 500 g of water are then added, and steam is passed in to distil off the isopropanol as an azeotropic mixture with water at a boiling point of up to 100° C. The 27% strength aqueous polymer solution thus obtained is then phosphonomethylated. The K value, measured on a 1% strength solution of the sodium salt in water, is 25.

Polymer 2

In a reactor as described for the preparation of polymer 1, 500 g of tetrahydrofuran are heated to the boil and admixed in the course of 3 hours with 270.4 g of acrylic acid and 29.6 g of N-vinylformamide dissolved in 100 g of tetrahydrofuran and a solution of 9 g of tert-butyl perethylhexanoate in 100 g of tetrahydrofuran added at a uniform rate at the boil (about 68° C.). This is followed by a further hour of heating at the boil, 200 g of water are then added, and steam is passed in to distil off the tetrahydrofuran at a boiling point of up to 100° C. The 39% strength polymer solution obtained, which has a K value of 41.6 (measured on a 1% strength solution of the sodium salt in water), in phosphonomethylated as described in Example 2.

Polymer 3

Prepared in the same way as polymer 1, except that 240. 8 [lacuna] of 100% strength acrylic acid and 59.2 g of N-vinylformamide are used. The K value of the polymer, measured on a 1% strength solution of the sodium salt in water, is 20.5.

Polymer 4

In a reactor as described for the preparation of polymer 1, 500 g of tetrahydrofuran are heated to the boil and admixed in the course of 3 hours with 274.8 g of methacrylate [sic], 25.2 g of N-vinylformamide dissolved in 100 g of tetrahydrofuran and a solution of 12 g of tert-butyl perpivalate in 100 g of tetrahydrofuran added at a uniform rate, and the mixture is subsequently refluxed for a further 2 hours. The K value of the polymer, measured in 1% strength in dimethylformamide, is 10.8. The polymer is phosphonomethylated after removal; cf. Example 4.

Polymer 5

In a reactor as described for the preparation of polymer 1, 920 g of isopropanol are heated to the boil and admixed in the course of 3 hours with 332 g of N-vinylformamide and a solution of 16.3 g of 2-mercaptoethanol in 25 g of isopropanol and in the course of 4 hours with a solution of 9.8 g of tert-butyl perethylhexanoate in 30 g of isopropanol added at uniform rates at the boil. This is followed by a further hour of heating, and steam is introduced to distill off the isopropanol at a boiling point of up to 99° C. The K value of the polymer, measured in 1% strength in water, is 15. The 42% strength aqueous polymer solution is then phosphonomethylated directly.

Polymer 6

In a reactor as described for the preparation of polymer 1, 589.2 g of water, 7.05 g of 75% strength phosphoric acid and 4.8 g of 50% strength sodium hydroxide solution are heated to 80° C. in a slow stream of nitrogen and admixed in the course of 3 hours with 260 g of N-vinylformamide and a solution of 40 g of acrylamidomethanepropanesulfonic acid and 15.5 g of 50% strength sodium hydroxide solution in 100 g of water and in the course of 4 hours with a solution of 2.25 g of 2,2'-azobis(2-methylproponiamide) dihydrochloride in 98 g of water added at uniform rates at 80° C. under nitrogen. This is followed by a further 3 hours of heating at 80° C. The K value of the copolymer, measured in 1% strength in water, is 79.2. The polymer solution is then phosphonomethylated.

Polymer 7

In a reaction as described for the preparation of polymer 1, 98 g of maleic anhydride and 386 g of tetrahydrofuran are heated to the boil and then admixed in the course of 3 hours with 71 g of N-vinylformamide and in the course of 4 hours with a solution of 1.69 g of 2,2'-azobis(2,4-dimethylvaleronitrile) in 120 g of tetrahydrofuran added at uniform rates at the boil. This is followed by a further hour of heating at the boil. After cooling, the polymer is filtered off from the slightly viscous suspension, washed with 200 ml of tetrahydrofuran and then dried at 50° C. in a vacuum drying cabinet. The white powder obtained has an N content of 7.8%, corresponding to an N-vinylformamide content of 39.6%. The yield is 135 g. The K value, measured on a 1% strength solution of the sodium salt in water, is 37.

Polymer 8

A reactor as described for the preparation of polymer 1, designed for pressures up to 6 bar, is charged with 250 g of isopropanol, which are then flushed 3 times with 3 bar of nitrogen and heated to 130° C. under super-atmospheric pressure, the final autogenous pressure being 4 bar. The contents are then admixed in the course of 3 hours with 220 g of methyl acrylate and a mixture of 22 g of N-vinylformamide and 400 g of isopropanol and in the course of 4 hours with a solution of 7.2 g of di-tert-butyl peroxide in 40 g of isopropanol added at uniform rates at 130° C. The contents are then cooled to room temperature and diluted with 9 g of water. The K value of the polymer, measured in 1% strength in dimethylformamide, is 10.

Polymer 9

A reactor as described for the preparation of polymer 1 is charged with 250 g of isopropanol, which are then flushed 3 times with 3 bar of nitrogen and thereafter heated under superatmospheric pressure to 130° C., the final autogenous pressure being 4 bar. The contents are then admixed in the course of 3 hours with 216.3 g of acrylic acid and a mixture of 23.8 g of N-vinylformamide and 40 g of isopropanol and in the course of 4 hours with a solution of 7.2 g of di-tert-butyl peroxide in 40 g of isopropanol. This is followed by a further 2 hours of heating at 130° C. The K value of the polymer, measured in 1% strength in dimethylformamide is 16.6.

Polymer 10

In a reactor as described for the preparation of polymer 1, 900 g of water are heated to 80° C. in a slow stream of nitrogen and admixed in the course of 3 hours with a mixture of 225 g of N-vinylformamide and 225 g of N-vinylpyrrolidone and a solution of 3.5 g of 2,2'-azobis(2-methylpropionamine) dihydrochloride and 125 g of water, followed in the course of 30 minutes by a solution of 1.1 g of 2,2'-azobis(2-methylpropionamidine) dihydrochloride in 25 g of water, and the mixture is subsequently heated for a further 2 hours. The K value of the polymer, measured in 1% strength in water, is 60.

Polymer 11

In a reactor as described for the preparation of polymer 1, 912 g of isopropanol are heated to the boil and admixed in the course of 3 hours with a mixture of 143 g of N-vinylformamide and 173 g of vinyl acetate and a solution of 3 g of 2-mercaptoethanol in 30 g of isopropanol and in the course of 4 hours with a solution of 9.5 g of tert-butyl perethylhexanoate and 30 g of isopropanol. The contents are then refluxed for a further 3 hours, then cooled and diluted with 400 g of water. The K value of the copolymer, measured in 1% strength in dimethylformamide, is 15. The polymer solution obtained is directly used for phosphonomethylation.

Polymer 12

In a reactor as described for the preparation of polymer 1, 800 g of tetrahydrofuran, 196 g of maleic anhydride, 137.6 g of vinyl acetate, 28.4 g of N-vinylformamide and 4 g of polyvinyl ethyl ether, of K value 50 (measured in 1% strength in cyclohexanone), as protective colloid for preventing coalescence of the precipitated polymer particles are heated under reflux and admixed in the course of 2 hours with a solution of 2 g of tert-butyl perethylhexanoate in 100 g of tetrahydrofuran. This is followed by a further 4 hours of heating at the boil. During this period tert-butyl perpivalate is added after ¼ hour, 1¼ hours and 2 hours in a 2 g portion each time. The thin suspension of the copolymer is concentrated under a waterjet vacuum in a rotary evaporator until dry. The K value of the polymer obtained as a slightly brownish powder is, measured in 1% strength in cyclohexanone, 9.0.

Polymer 13

In a reactor as described for the preparation of polymer 1, 350 g of water, 117.5 g of maleic anhydride, 6.45 g of ferroammonium sulfate and 86.4 g of sodium hydroxide are heated to the boil and then admixed in the course of 5 hours with a solution of 232 g of acrylic acid and 41 g of water and also a solution of 93 g of N-vinylformamide and 27 g of water and 237 g of 30% strength sodium hydroxide solution and in the course of 6 hours with a solution of 46 g of hydrogen peroxide in 50 g of water added at uniform rates. This is followed by a further 2 hours of heating at the boil. The pH of the resulting solution is 5.1, and the K value of the resulting polymer, measured in 1% strength in water, is 42.

Polymer 14

In a reactor as described for the preparation of polymer 1, 450 g of water, 50 g of vinylpyrrolidone, 0.05 g of sodium hydroxide, 1 g of N,N'-divinylethyleneurea and 0.1 g of sodium dithionite are heated at 60° C. and [sic] a slow stream of nitrogen. After about 45 minutes, white polymer flakes precipitate from the previously clear solution, gradually increasing in number. After 10 minutes, a solution of 150 g of N-vinylformamide and 3 g of N,N-divinylethylenurea is metered in over 20 minutes and stirred and the whole is stirred at 60° C. over 2 hours. During this period the polymer solution must be diluted with 1250 g of water to maintain stirrability. After cooling, the viscous polymer is filtered off, washed with 5 l of water and dried at 50° C. in a vacuum drying cabinet. The yield of dry powder is 180 g, and the powder is then subjected to phosphonomethylation; cf. Example 14.

Polymer 15

In a reactor as described for the preparation of polymer 1, 500 g of water, 5.9 g of 75% strength phosphoric acid and 4 g of 50% strength sodium hydroxide solution are heated to 70° C. in a slow stream of nitrogen and admixed in the course of 3 hours with 638 g of N-vinylformamide and a solution of 12.9 g of 2-mercaptoethanol in 30 g of eater and in the course of 4 hours with a solution of 3.1 g of 2,2'-azobis-(2-methylpropionamidine) dihydrochloride in 95 g of water added at uniform rates at 70° C. This is followed by a further 3 hours of heating, cooling to 50° C., removal of a sample for the K value determination, the introduction of 393 g of hydrogen chloride gas in the course of 2 hours and thereafter a further 3 hours of heating at 50° C. during which 95% of the formamide units of the polymer are converted into vinylamine units. The aqueous solution is then brought to pH 12 with sodium hydroxide solution, and the sodium chloride and sodium formate formed are removed from the aqueous solution by electrodialysis. Thereafter, the aqueous solution of the copolymer formed from 95 mol % of vinylamine and 5 mol % of vinylformamide and having a K value of 30 is subjected to phosphonomethylation; cf. Example 15.

II. General method of phosphonomethylation

1. In two steps 125 parts of vinylformamide homopolymer or copolymer are refluxed with 150 parts of concentrated hydrochloric acid (cf. Table 1). Thereafter the hydrolysis of the formamide group is in general complete. The mixture is used in the next step without further workup.

The hydrolyzate thus obtained is admixed with 50 parts of water, followed by phosphorous acid, specifically in a molar ratio of 2.1:1, based on the vinylformamide content of the polymer, if complete phosphonomethylation is desired. The mixture is then refluxed. An aqueous, approximately 30% strength formaldehyde solution is slowly added dropwise. The molar ratio of formaldehyde to VFA originally present in the polymer is within the range from 4:1 to 8:1 (cf. Table 1).

On completion of the addition the mixture is refluxed for a further 15 hours. The volatiles and excess reagents are removed by a 2-hour steam treatment, and the solution obtained is concentrated to about a third of its volume.

To purify the phosphonomethylated polymers, the polymers are precipitated in the form of the sodium salt by adding the still acid concentrated solution dropwise to ten times the volume of methanolic sodium hydroxide solution in which the amount of NaOH used should correspond to the acid number equivalent of the concentrated reaction mixture. If the sodium salts are obtained as solids, they are filtered off, washed with methanol and dried. Oily products are dealt with by decanting, repeated washing with methanol or reprecipitation if necessary, and subsequent drying.

2. In one stage (without preliminary hydrolysis step)

The reaction and workup are carried out completely analogously to 1., except for the hydrolysis, by adding together polymer, hydrochloric acid, water and phosphorous acid and treating this mixture as described under 1.

Table 1 contains the products prepared from polymers 1 to 15 by phosphonomethylation according to methods 1. and 2. The degree of conversion was determined via organically bonded phosphorus to nitrogen mass ratios determined by elemental analysis or by ion chromatography. The theoretical value for a double reaction of a primary amine is given by 2×31:14=4.43.

TABLE 1

| Ex. No. | Polymer No. | Method | Hydrolysis time | 1) VFA:CH$_2$O:H$_3$PO$_3$ molar ratio | % P: % N | isolated as | Consistency |
|---|---|---|---|---|---|---|---|
| 1 | 1 | 1 | 2 h | 1:4:2 | 4.3 | sodium salt | solid |
| 2 | 2 | 2 | — | 1:4:2 | 4.1 | sodium salt | solid |
| 3 | 3 | 1 | 2 h | 1:4:2 | 4.4 | sodium salt | solid |
| 4 | 3 | 1 | 1 h | 1:4:2 | 2.6 | sodium salt | solid |
| 5 | 4 | 1 | 2 h | 1:4:2 | 4.4 | sodium salt | solid |
| 6 | 5 | 2 | — | 1:8:2 | 0.5 | sodium salt | solid |
| 7 | 6 | 2 | — | 1:8:2 | 4.4 | sodium salt | solid |
| 8 | 7 | 1 | 1 h | 1:4:2 | 1.8 | sodium salt | solid |
| 9 | 8 | 1 | 2 h | 1:1:1 | 0.5 | sodium salt | solid |
| 10 | 8 | 2 | — | 1:8:2 | 3.0 | sodium salt | solid |
| 11 | 8 | 2 | — | 1:8:2 | 3.8 | sodium salt | solid |
| 12 | 9 | 1 | 2 h | 1:1:1 | 0.3 | sodium salt | solid |
| 13 | 9 | 1 | 20 h | 1:8:2 | 4.4 | sodium salt | solid |

TABLE 1-continued

| Ex. No. | Polymer No. | Method | Hydrolysis time | 1) VFA:CH$_2$O: H$_3$PO$_3$ molar ratio | % P: % N | isolated as | Consistency |
|---|---|---|---|---|---|---|---|
| 14 | 10 | 2 | — | 1:8:2 | 3.2* | sodium salt | solid |
| 15 | 11 | 1 | 2 h | 1:4:2 | 2.5 | sodium salt | solid |
| 16 | 12 | 2 | — | 1:8:2 | 2.8 | sodium salt | solid |
| 17 | 13 | 2 | — | 1:8:2 | 4.4 | sodium salt | solid |
| 18 | 14 | 1 | 2 h | 1:8:2 | 0.9* | sodium salt | solid |

*corrected for VFA content
1) VFA = N-vinylformamide

III. APPLICATION EXAMPLES

A. Water treatment

CaSO$_4$ test 500 ml of a saturated CaSO$_4$ solution are evaporated down to 200 g at 200° C. in a drying cabinet. The mixture is left to stand overnight and is filtered through a membrane filter (0.45 μm) the next day. 50 ml of filtrate are titrated with a 0.2 M titriplex III solution (ethylenedinitrilotetracetic acid, disodium salt, dihydrate), and the calcium content still in solution is determined. The inhibition on addition of 1 ppm of polymer was calculated against a blank sample.

$$\% \text{ inhibition} = 100 - \frac{\text{mg of CaSO}_4 \text{ on filter (with 1 ppm of polymer)}}{\text{mg of CaSO}_4 \text{ on filter (blank sample without polymer)}}$$

CaCO$_3$ test

An aqueous test solution is prepared with the following components:

3.36 g of NaHCO$_3$/l
1.58 g of CaCl$_2$·2 H$_2$O/l
0.88 g of MgSO$_4$/l 100 ml of the above solution are pipetted into a 250 ml flask and admixed with 5 ppm of dispersant, and the flask is sealed and stored at 86° C. for 16 hours. After cooling to room temperature and filtration, the solution is titrated with a 0.2 M solution of Na$_2$H$_2$ EDTA.

$$\text{Inhibition } 100 \left[ 1 - \frac{\text{Consumption of ml of 0.2 M Na}_2\text{H}_2 \text{ EDTA (with polymer)}}{\text{Consumption of ml of 0.2 M Na}_2\text{H}_2 \text{ EDTA (blank sample without polymer)}} \right]$$

Calcium phosphate test 100 ml of a solution are prepared with the following concentrations:

1.095 g/l of CaCl$_2$·6H$_2$O
0.019 g/l of Na$_2$HPO$_4$·2H$_2$O
1 ppm of polymer The pH is adjusted to 8.6 with a borax buffer. The solution is then stirred at 70° C. for 3 hours and left to stand for 24 h. Thereafter the light transmission (LT) [white light] is determined with a photometer. The photometer is standardized beforehand with distilled water to 100% LT.

$$\% \text{ inhibition} = \frac{100 - LT \text{ (with 1 ppm of polymer)}}{100 - LT \text{ (blank sample without polymer)}} \times 100$$

Ca ion compatibility 200 ml of a solution of the following composition are prepared:

1.565 g/l of CaCl$_2$·6H$_2$ O
3 g/l of KCl
45 ppm of polymer

The pH is adjusted to 9 with NaOH, and the solution is then boiled for 30 minutes. The evaporated solution is then made up to 200 ml with distilled water, and the light transmission (LT) is measured (LT for distilled water= 100%). The higher the LT value, the better the compatibility of the products with calcium ions.

TABLE 2

| Polymer of Ex. No. | CaSO$_4$ test | % Inhibition CaCO$_3$ test 5 ppm | Ca$_3$(PO$_4$)$_2$ test 1 ppm | Ca compatibility % light transmission 45 ppm |
|---|---|---|---|---|
| 5 | 22 | 48 | 22 | 90 |
| 10 | 61 | 61 | 33 | 93 |
| 12 | 30 | 61 | 13 | 95 |
| 13 | 35 | 62 | 11 | 85 |
| 16 | 18 | 48 | 42 | 100 |
| Dequest 2046[1]. | 42 | 39 | 32 | 78 |

[1]ethylenediaminetetramethylenephosphonic acid, sodium salt

The above results clearly show that phosphonomethylated polymers are in some instances superior to Dequent 2046 while at the same time exhibiting a better calcium ion compatibility.

B. Detergent additive

Incrustation inhibition

To test the incrustation-inhibiting effect of the above-described copolymers they were incorporated in two different pulverulent detergents A and B. These detergent formulations were both used to wash two types of cotton test fabric, one of which was a terry toweling fabric. The number of wash cycles was 20. Following this number of washes, each fabric was ashed to determine the ash content. The result reported is the total effectiveness in %, determined for both fabrics, 0% indicating no reduction in the degree of fabric incrustation (ash) while 100% indicates complete prevention of fabric incrustation (ash).

| Experimental conditions for determining incrustation: | |
|---|---|
| Apparatus: | Launder-O-Meter from Atlas, Chicago |
| Number of wash cycles: | 15 |
| Wash liquor: | 250 ml, the water used containing 4 mmol of hardness per liter (molar ratio of calcium to magnesium equal to 4:1) |
| Washing time: | 30 min at 60° C. (including heating-up time) |
| Detergent dose: | 8 g/l |
| Detergent A | |

12.5% of dodecylbenzenesulfonate (50%)
4.7% of C 13/C 15 oxo alcohol polyglycol ether (7 EO)
2.8% of soap -continued Experimental conditions for determining incrustation:

25% of zeolite A
  4% of sodium disilicate
  1% of magnesium silicate
20% of sodium perborate
14% of sodium sulfate
10% of copolymer
remainder to 100%: sodium sulfate
Detergent B 12.5% of dodecylbenzenesulfonate (50%)
4.7% of C 13/C 15 oxo alcohol polyglycol ether (7 EO)
2.8% of soap
10% of pentasodium triphosphate
24% of zeolite A
  6% of sodium disilicate
  1% of magnesium silicate
20% of sodium perborate
15% of sodium sulfate
  3% of copolymer
remainder to 100%: sodium sulfate
Perborate stabilization The hydrogen peroxide responsible for the bleaching effect in sodium perborate-containing detergent formulations is catalytically decomposed by heavy metal ions (Fe, Cu, Mn). This can be prevented by complexing the heavy metal ions. The peroxide-stabilizing effect of the complexing agents is tested via the residual peroxide content following storage of the heavy metal-containing wash liquor at elevated temperature.

The hydrogen peroxide content is determined before and after storage by titration with potassium permanganate in acid solution.

Perboarte stabilization is tested using two detergent formulations and adding 2.5 ppm of a mixture of 2 ppm of $Fe^{3+}$, 0.25 ppm of $Cu^{2+}$ and 0.25 ppm of $Mn^{2+}$ as heavy metal catalyst during hot storage.

1. Detergent C
Phosphate-containing formulation composition:

19.3% of sodium $C_{12}$-alkylbenzenesulfonate (50% strength by weight aqueous solution)
  15.4% of sodium perborate·4 $H_2O$
  30.8% of sodium triphosphate
  2.6% of copolymer of maleic acid and acrylic acid (50:50, average MW 50,000)
  31.0% of sodium sulfate, anhydrous
  0.9% of novel complexing agent or comparative compound (as sodium salt)
remainder to 100%: $Na_2SO_4$ The detergent concentration is 6.5 g/l using water of 25° German hardness. The storage conditions are 2 hours at 80° C.

2. Detergent D
Reduced-phosphate formulation composition (in % by weight):

15% of sodium $C_{12}$-alkylbenzenesulfonate (50% strength by weight aqueous solution)
  5% of addition production of 11 mol of ethylene oxide with 1 mol of tallow fatty alcohol
  20% of sodium perborate·4 $H_2O$
  6% of sodium metasilicate·5$H_2O$
  1.25% of magnesium silicate
  20% of sodium triphosphate
  31.75% of sodium sulfate, anhydrous
  1% of novel complexing agent or comparative compound (as sodium salt)

The detergent concentration is 8 g/l using water of 25° German hardness. The storage conditions are 1 hour at 60° C.

The result is reported as % stabilization, with 0% stabilization indicating complete decomposition of the bleaching liquor and 100% stabilization indicating complete retention of bleaching agent activity.

TABLE 3

| Polymer number | Incrustation inhibition [% activity] Detergent | | Perborate stabilization [% stabilization] | | | |
|---|---|---|---|---|---|---|
| | | | Detergent C | | Detergent D | |
| | A | B | 5% | 10% addition | 5% | 10% addition |
| 13 | 66 | — | 74.1 | 83.0 | 84.9 | 90.6 |
| 16 | — | 69 | 64.0 | 93.4 | 76.7 | 97.7 |
| 17 | 80.8 | — | 92.0 | 95.6 | 97.7 | 100.0 |
| no addition | 0 | 0 | 20.0 | — | 30.0 | — |
| Polymer[1] according to EP 25 551 | 80.2 | 77 | 20.0 | — | 30.0 | — |

[1]Copolymer of 70% of acrylic acid and 30% of maleic acid, molecular weight 70,000.

The Examples reveal that the copolymers according to the present invention not only produce a state of the art reduction in incrustation in various detergent formulations but also have a bleaching agent stabilizing effect which otherwise has only been observed on addition of complexing agents.

We claim:

1. In a water-carrying system subject to the formation of scale, the improvement comprising the water in said water-carrying system comprises from 0.1–100 ppm of a phosphonomethylated polyvinylamine which contains as characteristic structural elements, units of the formula $$\begin{array}{c}-CH_2-CH-\\|\\N\\/\ \backslash\\R^1\ \ CH_2-P\overset{O}{\underset{OX}{\overset{\|}{\diagdown}}}OX\end{array} \quad (I)$$

wherein $R^1$ is hydrogen, $C_1$–$C_6$-alkyl or $$-CH_2-P\overset{O}{\underset{OX}{\overset{\|}{\diagdown}}}OX$$

and X is hydrogen an alkali metal, ammonium or one equivalent of an alkaline earth metal;
  wherein said polymer has a K value of from 10 to 100.

2. The water-carrying system of claim 1, wherein $R^1$ is $CH_2$—$PO_3X_2$.

3. A method of inhibiting scale deposition in a water-carrying system subject to scale formation comprising adding to said system a scale deposition inhibiting amount of a phosphonomethylated polyvinylamine which contains as characteristic structural elements, units of the formula

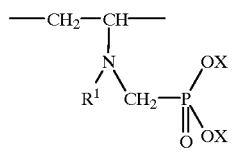 (I)

wherein $R^1$ is hydrogen, $C_1$–$C_6$-alkyl or

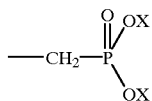

and X is hydrogen, an alkali metal, ammonium or one equivalent of an alkaline earth metal;
wherein said polymer has a K value of from 10 to 100.

4. The method of claim 3, wherein said phosphonomethylated polyvinylamine is added in an amount of from 0.1 to 100 ppm.

5. The method of claim 3, wherein $R^1$ is $CH_2$—$PO_3X_2$.

6. The water-carrying system of claim 1, wherein said phosphonomethylated polyvinylamine is obtained by hydrolyzing and phosphonomethylating a copolymer containing 5–95 mol % of N-vinylformamide.

7. The water-carrying system of claim 6, wherein said phosphonomethylated polyvinylamine is obtained by exhaustively phosphonomethylating said copolymer.

8. The water-carrying system of claim 6, wherein said phosphonomethylated polyvinylamine is obtained by incompletely phosphonomethylating said copolymer.

9. The method of claim 3, wherein said phosphonomethylated polyvinylamine is obtained by hydrolyzing and phosphonomethylating a copolymer containing 5–95 mol % of N-vinylformamide.

10. The method of claim 3, wherein said phosphonomethylated polyvinylamine is obtained by exhaustively phosphonomethylating said copolymer.

11. The method of claim 8, wherein said phosphonomethylated polyvinylamine is obtained by incompletely phosphonomethylating said copolymer.

12. The water-carrying system of claim 1, wherein said water-carrying system is an open or closed cooling cycle.

13. The water-carrying system of claim 12, wherein said system is selected from the group consisting of a reactor, a distillation apparatus, a boiler and a steam generator.

14. The water-carrying system of claim 1, wherein said system is used for desalting of sea water or brackish sea water by a distillation or membrane process.

* * * * *